Jan. 15, 1957
P. H. KINSEY
2,777,374
SELF-PROPELLED GARDEN CULTIVATOR
Filed Sept. 21, 1954
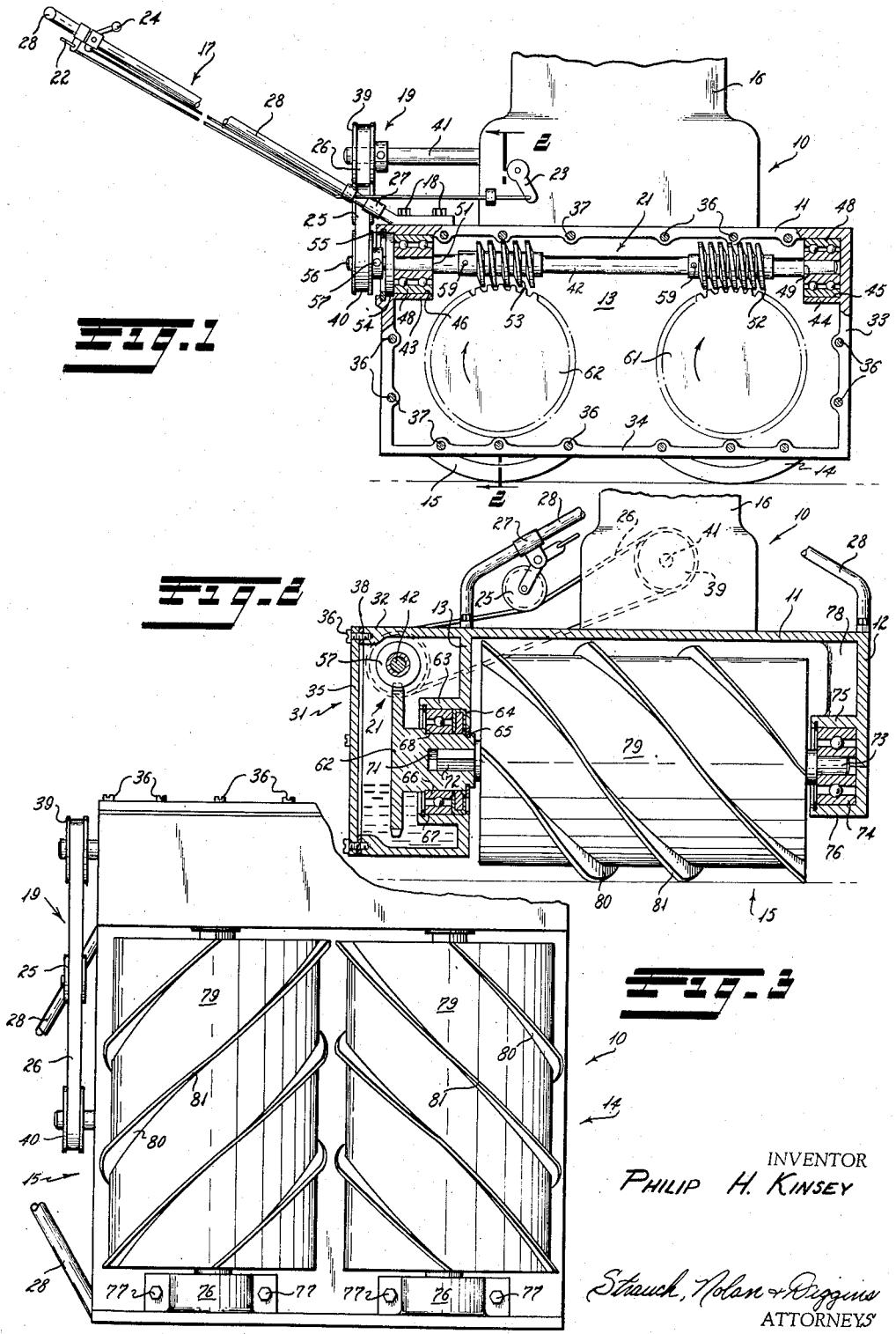
INVENTOR
PHILIP H. KINSEY
ATTORNEYS

United States Patent Office

2,777,374
Patented Jan. 15, 1957

2,777,374

SELF-PROPELLED GARDEN CULTIVATOR

Philip H. Kinsey, Fort Myers, Fla.

Application September 21, 1954, Serial No. 457,399

6 Claims. (Cl. 97—41)

The present invention relates to cultivators and more particularly to power driven cultivators having self-contained power means and of a size adapting them for home garden, nursery stock farm, small orchard and fruit grove usage where the spacing of the plantings and expense of maintaining tractor and horse drawn cultivators militates against the practical and economical use of conventional farm type cultivating equipment.

At the present time cultivation of gardens, nursery stock farms, small orchards and fruit groves is largely done by individuals using hand hoes and cultivators. As a consequence, an inordinate amount of time is entailed in such cultivation resulting in high costs and difficulty in obtaining the necessary labor due to the physical effort required. Furthermore, because of the tediousness of the work and the unreliability of obtainable help proper and efficient cultivation is not often obtained.

It, accordingly, is the primary object of this invention to provide self-contained engine or motor powered cultivators adapted for selective forward and sidewise powered movement controlled by a walking operator suitably manipulating a handle structure mounting throttle and clutch controls.

Still another important object of this invention is to provide a garden cultivator having rotary cultivating drums or rollers arranged to support the cultivator for translatory movement over the surface of the ground and adapted, through spiral, peripheral, axially extending ribs, for breaking the earth and directing it toward the plant rows at the respective sides of the machine to hill and mulch the plants in adjacent rows.

Still another object of the present invention resides in providing a self-powered garden cultivator with a pair of laterally extending spaced support and earth cultivating drums or rollers adapted to be driven in a direction to secure forward translatory movement of the cultivator over the ground when both drums proportionately bear the weight of the machine and to effect translatory movement in opposite sidewise directions when the one or the other drum is raised out of ground engaging position by tilting of the cultivator around the other drum as a fulcrum.

Still another object of the present invention is to provide a garden cultivator of the character heretofore mentioned with a drum or roller drive gear transmission adapted to drive the trailing drum at a slower speed than the leading drum thereby imposing a drag on the forward movement of the cultivator causing the leading drum to perform most of the cutting and cultivating functions.

Further objects of the present invention will appear as the description is read in conection with the appended claims and accompanying drawings wherein:

Figure 1 is a side view of the garden cultivator of the present invention looking into the gear transmission box, the cover of which is removed;

Figure 2 is a transverse sectional view taken substantially on line 2—2 of Figure 1;

Figure 3 is a bottom plan view of the cultivator of Figures 1 and 2 illustrating the relationship of the front and rear drums or rollers.

With continued reference to the drawings wherein the same parts are designated throughout by the same reference numerals, the garden cultivator of this invention is generally indicated by reference numeral 10. Cultivator 10 is made up of a planar support plate 11, having depending laterally spaced flanges or walls 12 and 13 respectively disposed along one side edge and inwardly from the opposed side edge of the planar support plate 11, support and cultivating drums or rolls 14 and 15 the opposite ends of which are respectively journalled in walls 12 and 13 to locate the drums in transverse parallel relationship, a gas engine or electric motor 16 supported on the upper surface of support plate 11, a control handle assembly 17 rigidly secured to the support plate 11 adjacent the rearmost edge thereof by means of cap screws 18, a belt and pulley drive 19 and a gear train 21 driven by belt and pulley drive 19 and drivingly connected to drums 14 and 15 for supplying rotative movement to support drums 14 and 15. Suitable speed control mechanism 22 forming a part of control handle assembly 17 and leading to speed controller 23 provided on engine 16 is preferably provided for controlling the speed of the engine. A clutch controller 24 also forming part of control handle assembly 17 is provided for readily disrupting the drive train between engine 16 and drums 14 and 15. While any suitable declutching mechanism may be used, the controller 24 illustrated operates to move a belt tightener pulley wheel 25 into and out of engagement with belt 26 of belt and pulley drive 19 to effect disengagement of the drive to drums 14 and 15 when desired. While belt tightener pulley 25 may be supported in any convenient manner it is illustrated for the purposes of this application as being carried by a support bracket 27 mounted on one of the cross arms of the rigidly mounted handle 28 (see Figure 2).

As clearly seen from Figure 1, drums 14 and 15 are of a diameter sufficient to assure their projection sufficiently below the bottom end of wall 13 to provide adequate ground clearance for the lower portion of gear box 31 provided to house gear train 21. Gear train 21, as clearly appears from Figures 1 and 2, is mounted in gear box 31 made up of the portion 32 of support plate 11 overhanging wall 13, opposed end walls 33, bottom wall 34 and a removable cover plate 35 secured to the outermost edges of the walls 33 and 34 and support plate portion 32 by means of cap screws 36 threaded into suitably tapped bosses 37 formed on the wall and plate members. Preferably a sealing gasket 38 is disposed between cover 35 and the abutting edges of the gear box walls to assure a liquidtight gear box and prevent ingress of dust and dirt into the gear box and gears and the reservoir of oil in gear box 31.

Belt and pulley drive 19 transmits rotation of engine shaft 41 to worm shaft 42 journalled in bearing bosses 43 and 44 formed on opposed gear box end walls 33 in axially aligned relation through pulley wheels 39 and 40 and belt 26. As clearly seen in Figure 1, bearing boss 44 has a blind bore 45 therein while bore 43 has a through step bore 46, the shoulder of which divides the bore into a bearing seat portion and seal seat portion. Assembly of the worm shaft and its supporting bearings is effected in the following manner:

First a suitable roller bearing 48 having inner and outer races is placed in bore 45. Shaft 42 having axially spaced shoulders 49 and 51 thereon and worm pinions 52 and 53 secured thereto is inserted through bore 46 and its journal end adjacent shoulder 49 is inserted into bearing 48 of boss 44 until the shoulder 49 abuts the end of the inner bearing race. A roller bearing 48 is then inserted in the bearing seat portion of boss 43 in surrounding relation to the journal portion of shaft 42 adjacent shoulder 51 and a conventional seal ring 54 of any suitable structure is inserted into the seal seat of boss 43. A split retainer ring 55 is then inserted in a retainer ring groove provided at the outer end of the seal seat of boss 43 to secure seal ring 54 and bearing 48 against outward movement. While the spacing of shoulders 49 and 51 is designed to assure planar alignment of shoulder 51 and the inner race of bearing 48 in boss 43 when the parts are assembled as described, shims may be employed between shoulder 51 and its adjacent bearing 48 to take up any end play that may be present between shaft 42 and its bearings so that snap ring 55, in cooperation with shoulders 49 and 51 and the bearings 48, will secure shaft 42 against endwise movement. The protruding end 56 of shaft 42 mounts pulley wheel 40 which is pinned to shaft 42 as indicated at 57.

Worm pinions 52 and 53 are fixed to shaft 42 at axially spaced points in vertical alignment with the center lines of drums 14 and 15 by pins 59. If disassembly of shaft 42 for any reason is desired, the shaft together with its seal ring 54, outer bearing 48 and pinions 52 and 53 may be removed as a unit merely by removing snap ring 55 reversely rotating shaft 42 until pinions 52 and 53 are freed from their mating gears, the reaction force acting through shoulder 51 to force outer bearing 48 and seal ring 54 out of boss 43, and then axially withdrawing the shaft through bore 46. Reversal of the withdrawal steps will result in reassembly of shaft 42 as will be apparent.

Worm pinions 52 and 53 are respectively adapted to drivingly engage worm gears 61 and 62 journalled in spaced bosses 63 respectively concentrically related to the axes of drums 14 and 15 and formed on the outer face of wall 13. Since both bosses 63 are identical in construction that provided for gear 62 only will be described. As clearly appears from Figure 2, boss 63 is provided with a stepped bore providing a shoulder 64 defining the inner end of a combined bearing and oil seal ring seat. A seal ring 65 is disposed in the seat against shoulder 64 and a ball bearing 66 having inner and outer races of conventional structure is held in place in the bore of boss 63 in abutting engagement with seal ring 65 by means of a snap ring 67 in well known manner. The hub of worm gear 61 is suitably formed to provide an annular shoulder 68 adapted, in assembled relation of the worm gear, to abut the outer face of the inner race of bearing 66 and is provided with an annular ring groove located in axially spaced relation to shoulder 68 in position to receive a snap ring 67 for securing worm gear 62 against axial displacement from bearing 66. The seal ring 65 prevents egress of oil past the bearing and gear hub in well known manner and also prevents dirt and dust from entering into gear box 31.

The hubs of gears 61 and 62 are provided with axially machined squared openings forming shaft sockets 71 adapted to receive the squared ends 72 of stub shafts journalling and drivingly connecting the respective drums 14 and 15 to their worm drive gears 61 and 62. The opposite ends 73 of drums 14 and 15 are respectively journalled in bearings 74 mounted in bearing bosses formed by semi-cylindrical bearing sockets 75 and mating semi-cylindrical caps 76 secured to bosses 75 by clamp screws 77 in well known manner. As clearly seen in Figure 2 semi-cylindrical bearing sockets 75 are formed at the lower end of depending wall 12 and are respectively reinforced by depending web sections 78.

While drums 14 and 15 may be formed in any suitable manner, the present invention contemplates that cylindrical drum sections 79 of suitable diameter and length having concentric stub shaft portions 72 and 73 suitably secured to their ends be provided with spiral webs or ribs 80 secured to the periphery of drums 79 by means of welding or the like. The invention further contemplates that the direction of the spiral on drum 15 be reversed with respect to that of drum 14 so that the oppositely directed thrust of the spirals resulting from engagement with the earth in use of the cultivator will tend to off-set each other and assure forward translatory movement of the cultivator over the surface of the ground so long as the weight of the cultivator is substantially proportionately distributed between the rollers. While spiral ribs 80 may be formed in any suitable manner and have any desired shape, the ribs in the drawings of the disclosed embodiment are shown as tapering outwardly to a substantial knife edge as indicated by numeral 81 to the end that the spiral ribs will more effectively pierce the soil under influence of the weight of the cultivator and in rotation of the drum effectively break up the uppermost layer of soil and cut and destroy the root growth of weeds and grass that may be present between the spaced rows of the garden crops being cultivated.

To assure most effective operation of the drums of this invention in cultivating and breaking up the ground, the present invention contemplates that the worm pinion 53 be provided with a lead approximately one-half that of the worm pinion 52 so the worm gears 61 and 62 and their respective drums 14 and 15 will be driven at differential speeds such that the gear 62 rotates approximately at half the speed of gear 61. As a consequence of this geared relationship, trailing drum 15, due to its slower rotation, will impose a drag on the forward movement of the cultivator causing lead drum 14 to perform most of the cutting and cultivating work.

Since the lateral width of cultivator 10 must be held to a minimum to assure free passage of the cultivator between the planted rows of garden produce or nursery stock, lateral movement of the cultivator with respect to the crop rows is particularly desirable in order to cultivate between the successive plantings in adjacent rows. The reverse spiral ribs of drums 14 and 15 is effective in accomplishing this purpose through manipulation of the operator handle 28 as will now be described. Assuming that the weight of the cultivator is normally distributed proportionately between the drums 14 and 15, forward motion of the cultivator over the ground will take place due to the unidirectional rotation of the drums 14 and 15 in clockwise direction as indicated by the arrows in Figure 1. This forward translatory movement of the cultivator is due not only to the rolling engagement between the ground and the periphery of the cylindrical drum portion 79 but also due to the forward force component resulting from engagement between the spiral ribs 80 of each of the rollers and the earth. Since the lateral thrust components of the spiral ribs, so long as proportionate weight distribution between the drums is maintained, will substantially off-set one another little, if any, lateral translatory movement will occur. However, if an upward pressure is applied to the extremity of handle 28 so as to slightly tilt the support plate 11 and its dependent wall structure, the weight of the cultivator will be shifted forwardly to impose a greater pressure on the forward or leading drum 14 and a little, if any, pressure is applied to the trailing roller 15. As a consequence, the off-setting effect of the spiral ribbing on the trailing drum is removed and the cultivator, under influence of the spiral ribbing on leading drum 14, will move to the left across the ground and in between the plantings of the left hand row being cultivated. This movement assures breaking of the earth and cultivation of the ground between the successive plants of the left hand row. Conversely downward pressure on the extremity of handle 28 shifts the weight of the cultivator rearwardly so that greater pressure is imposed upon the trailing drum 15 and little, if any, is applied to leading drum 14. Since the trailing rotor is provided with right hand spiralling ribs the preponderant action of the trailing drum will cause lateral movement to the right to move the cultivator laterally in between the successive plantings of the right hand row. It will be seen, therefore, that the present invention effectively provides for forward and lateral movement of the cultivator under power in a manner to assure effective cultivation of garden rows, nursery stock rows and the ground between the trees of small orchards and groves.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A self-propelled power driven garden cultivating or like machine comprising frame means; propulsion means mounted on said frame means and having a drive shaft extending toward and beyond an edge of said frame means; a drive element secured to the free end of said drive shaft; drive gear means mounted on said frame means and comprising a pinion shaft, a driven element secured to one end of said pinion shaft, pinion gear means secured to said pinion shaft and driven gears meshingly engaging said pinion gear means; a drive connection drivingly connecting said drive element and said driven element; a pair of laterally disposed support drums each having oppositely extending shaft portions at their opposite ends respectively adapted to be drivingly connected to said driven gears and journalled by said frame means and having a diameter sufficiently large to support said frame means with its drive gear means in spaced relation above the surface of the ground; a right hand spiral rib on the periphery of and extending longitudinally of one of said drums; a left hand spiral rib on the periphery of and extending longitudinally of the other of said drums; and an upwardly inclined handle means secured to said frame means and adapted to be grasped by an operator and manipulated by alternate application of pressure downwardly and upwardly thereon to selectively distribute the machine weight between said drums and shift the weight to said one of said drums then to said other of said drums whereby said drums will be alternately effective to propel said cultivating or like machine respectively forwardly between adjacent rows of plants, to the right, or to the left while said spiral ribs penetrate the ground surface breaking the earth and working up the ground between said rows of plants and between spaced plants in the respective adjacent rows.

2. The machine of claim 1 wherein said drive gear means comprises a closed gear box providing an oil reservoir and said pinion shaft and said driven gears are journalled in walls of said gear box and are each provided with an axially extending, end opening socket the open ends of which are disposed at the outer face of the respective gear box wall in position to drivingly receive the adjacent extending shaft portions of said support drums.

3. The machine of claim 1 wherein said pinion gears comprise a pair of pinion gears disposed in axially spaced relation upon said pinion shaft and said driven gears comprise a pair of driven gears journalled in side-by-side spaced relation in said frame means in position to respectively meshingly engage one of said pinion gears and each of said driven gears is provided with an axially extending, square bore and the drum shaft portions at one end of each of said support drums comprise a square shaft adapted to drivingly engage in a respective one of said square gear bores.

4. The machine of claim 1 wherein the one of said driven gears and its pinion associated with the trailing drum are adapted to effect rotation of said trailing drum at a speed approximately one-half that of the other drum.

5. A self-propelled power driven garden cultivating or like machine comprising frame means providing a generally laterally extending support surface and depending, laterally spaced flange members; a pair of spaced, parallel, laterally extending, support drums of a diameter adapting said drums to support said frame means with its depending flanges in spaced relation above the surface of the ground journalled for rotation in said depending flanges; respective oppositely spiralling, axially extending, peripherally disposed, rib elements on the peripheries of said respective drums; drive means on said frame means including gear trains respectively drivingly connected to each of said support drums and arranged to drive said drums in the same direction; and handle means secured to said frame means and inclined upwardly therefrom in a direction generally normal to the axes of said support drums and adapted upon application of pressure upwardly or downwardly on the handle to distribute the weight of the machine equally between said support drums or shift the weight of the machine to one or the other of said drums whereby said drums will be effective to propel said machine forwardly between adjacent rows of garden plants and selectively toward one row of plants and then the other to break and cultivate the ground surface between said adjacent rows and between longitudinally spaced plants in said respective adjacent rows.

6. The machine of claim 5 wherein said gear trains comprise a worm shaft journalled in said frame means and having a pair of worm pinions fixed thereto in longitudinally spaced relation, a worm gear journalled in said frame means adjacent one of said pinions and meshingly engaging said one of said pinions and a second worm gear journalled in said frame means adjacent the other of said pinions and meshingly engaging said other of said pinions.

References Cited in the file of this patent

UNITED STATES PATENTS

| 1,293,146 | McMorran | Feb. 4, 1919 |
| 1,791,812 | Harrison | Feb. 10, 1931 |
| 2,256,220 | Sjogren | Sept. 16, 1941 |
| 2,545,735 | Howard | Mar. 20, 1951 |
| 2,617,341 | Clayton | Nov. 11, 1952 |
| 2,691,928 | Kelsey et al. | Oct. 19, 1954 |
| 2,725,812 | Frank | Dec. 6, 1955 |

FOREIGN PATENTS

| 214,508 | Great Britain | Apr. 24, 1924 |
| 617,726 | Great Britain | Feb. 10, 1949 |
| 141,676 | Australia | June 19, 1951 |